United States Patent
Jones

(10) Patent No.: US 10,769,113 B2
(45) Date of Patent: Sep. 8, 2020

(54) ATTRIBUTE-BASED DEPENDENCY IDENTIFICATION FOR OPERATION ORDERING

(71) Applicant: Microsoft Technology Licensing, LLC., Redmond, WA (US)

(72) Inventor: Brian David Jones, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1038 days.

(21) Appl. No.: 15/198,908

(22) Filed: Jun. 30, 2016

(65) Prior Publication Data

US 2017/0277437 A1    Sep. 28, 2017

Related U.S. Application Data

(60) Provisional application No. 62/313,633, filed on Mar. 25, 2016.

(51) Int. Cl.
| | |
|---|---|
| *G06F 3/06* | (2006.01) |
| *G06F 16/901* | (2019.01) |
| *H04L 29/08* | (2006.01) |
| *G06F 16/178* | (2019.01) |
| *G06F 16/182* | (2019.01) |

(52) U.S. Cl.
CPC ........ *G06F 16/178* (2019.01); *G06F 16/1844* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 5,361,357 A | 11/1994 | Kionka | |
| 5,493,682 A | 2/1996 | Tyra et al. | |
| 5,666,532 A | 9/1997 | Saks et al. | |

(Continued)

FOREIGN PATENT DOCUMENTS

GB    2468742 A    9/2010

OTHER PUBLICATIONS

Bairavasundaram, et al., "Tolerating File-System Mistakes with EnvyFS", In Proceedings of In USENIX Annual Technical Conference, Jun. 14, 2009, pp. 1-25.

(Continued)

*Primary Examiner* — James Trujillo
*Assistant Examiner* — J Mitchell Curran

(57) ABSTRACT

Systems, components, devices, and methods for synchronizing a local object model with a remote object model are provided. A non-limiting example is a system or method for synchronizing a local object model with a remote object model. The method includes receiving a plurality of changes associated with the local object model. The changes modify at least one attribute state of an object in the local object model. The method also includes identifying outcome attribute states of the objects that are modified by the plurality of changes. The method includes identifying required attribute states of the objects for the plurality of changes. The method also includes building a dependency graph for the plurality of changes based on the identified required attribute states and generating an ordered list of the plurality of changes based on the dependency graph.

20 Claims, 9 Drawing Sheets

(56) References Cited

U.S. PATENT DOCUMENTS

| | | | |
|---|---|---|---|
| 6,594,822 B1 | 7/2003 | Schweitz et al. | |
| 7,167,862 B2 * | 1/2007 | Mullins | G06F 9/4493 |
| 7,539,976 B1 | 5/2009 | Ousterhout et al. | |
| 7,716,189 B1 | 5/2010 | Panchbudhe et al. | |
| 2002/0161883 A1 | 10/2002 | Matheny et al. | |
| 2006/0106841 A1 | 5/2006 | Bybee et al. | |
| 2006/0253502 A1 | 11/2006 | Raman et al. | |
| 2008/0189679 A1 * | 8/2008 | Rodriguez | G06F 8/34 |
| | | | 717/105 |
| 2009/0089552 A1 | 4/2009 | Inchingolo et al. | |
| 2010/0220584 A1 | 9/2010 | DeHaan et al. | |
| 2012/0079502 A1 * | 3/2012 | Kwan | G06F 8/71 |
| | | | 718/106 |
| 2012/0102569 A1 * | 4/2012 | Turbin | G06F 21/56 |
| | | | 726/24 |
| 2014/0289189 A1 | 9/2014 | Chan et al. | |
| 2015/0312342 A1 | 10/2015 | Gunda et al. | |
| 2015/0339107 A1 | 11/2015 | Krishnamurty et al. | |
| 2016/0188232 A1 * | 6/2016 | Ramachandran | G06F 3/0619 |
| | | | 711/162 |
| 2017/0154123 A1 * | 6/2017 | Yurchenko | G06F 16/9024 |

OTHER PUBLICATIONS

PCT International Search Report and Written Opinion in International Application PCT/US2017/023489, dated May 9, 2017, 12 pages.

\* cited by examiner

ATTRIBUTE-BASED DEPENDENCY IDENTIFICATION FOR OPERATION ORDERING

CROSS-REFERENCE TO RELATED APPLICATIONS

This application claims priority to U.S. Provisional Application Ser. No. 62/313,633, entitled "ATTRIBUTE-BASED DEPENDENCY IDENTIFICATION FOR OPERATION ORDERING," filed on Mar. 25, 2016, the entire disclosure of which is hereby incorporated herein by reference.

BACKGROUND

Network-based storage services store files on a computing device that is available via a network. Non-limiting examples of network-based storage services include OneDrive from Microsoft Corporation of Redmond, Wash., Google Drive from Google Inc. of Mountain View, Calif., Box from Box Inc. of Los Altos, Calif., Dropbox from DropBox, Inc. of San Francisco, Calif., Syncplicity from Syncplicity LLC of Santa Clara, Calif., and ODrive from Oxygen Cloud, Inc. of Redwood City, Calif. Depending on the use, the files stored using the network-based storage services may be accessible to only a single user or to multiple users.

Network-based storage services also often synchronize files that are stored locally on a client computing device with files stored by the network-based storage services. For example, the network-based storage services may synchronize files located in one or more directories in a file system on the client computing device. After a file in the directory is edited by a user, the changes to the file are relayed to the network-based storage services. Conversely, if a file that is being synchronized is changed in the network-based storage services (e.g., by another user having access to the file), those changes are relayed to the file on the client computing device.

Multiple changes may be grouped for synchronization at the same time. When the changes depend on one another, they may need to be applied in a particular order to comply with various policies that govern the file system (e.g., a file cannot be created in a folder that does not exist). The synchronization operation may fail if the changes are not applied in the correct order.

It is with respect to these and other general considerations that aspects have been made. Also, although relatively specific problems have been discussed, it should be understood that the aspects should not be limited to solving the specific problems identified in the background.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, components, devices, and methods for synchronizing a local object model with a remote object model are provided. A non-limiting example is a system or method for synchronizing a local object model with a remote object model. The method includes receiving a plurality of changes associated with the local object model. The changes modify at least one attribute state of an object in the local object model. The method also includes identifying outcome attribute states of the objects that are modified by the plurality of changes. The method includes identifying required attribute states of the objects for the plurality of changes. The method also includes building a dependency graph for the plurality of changes based on the identified required attribute states and generating an ordered list of the plurality of changes based on the dependency graph.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

Non-limiting and non-exhaustive examples are described with reference to the following figures.

DETAILED DESCRIPTION

Figure 1:
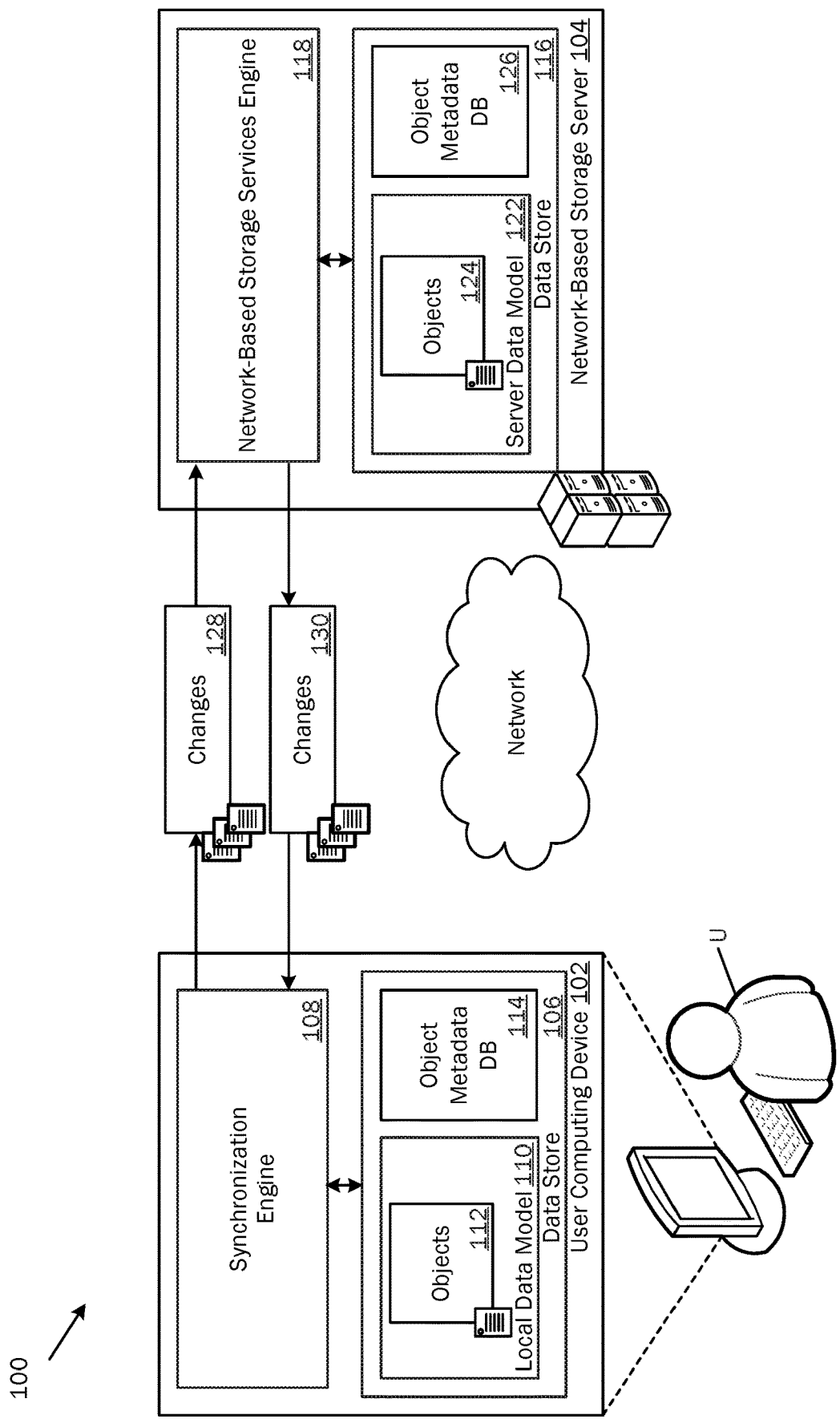
FIG. 1 is a simplified block diagram of an example of a system for synchronizing a local data model and a remote data model.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

File synchronization is useful for many common activities. For example, co-authoring involves multiple users accessing a shared file from multiple computing devices to edit the file simultaneously. As users edit files, those edits need to be synchronized to the other users. Files may also be moved or renamed and those changes need to be synchronized as well. Synchronization operations may be performed after multiple changes have been made either locally or remotely. In some situations, the changes will need to be performed in a particular order to comply with constraints of the data model governing the file system. The changes can be analyzed as described herein to determine an appropriate order for applying any detected changes so as to comply with the constraints of the file system.

FIG. 1 is a simplified block diagram of an example of a system 100 for synchronizing a local data model and a remote data model. As illustrated in FIG. 1, the system 100 includes a user computing device 102 that is operable by a user U and a network-based storage server 104. The user computing device 102 and the network-based storage server 104 communicate over a network.

The user computing device 102 includes a data store 106 and a synchronization engine 108. The data store 106 stores a local data model 110 and the object metadata database 114 as well as other data. The data store 106 may comprise one or more file systems and databases such as relational databases.

The local data model 110 may, for example, comprise a directory structure such as a file system. The local data model 110 includes objects 112. The local data model 110 may impose various constraints on the objects and their relationships with each other. Some example constraints include:

Name collisions. Any given parent (e.g., a directory/folder) cannot include more than one child object (e.g., file or directory/folder) with the same name at any given time. In some aspects, the name collisions are determined in a case-sensitive or case-insensitive manner.

Parentless additions. A file or folder cannot be created until it has an existing parent folder.

Parentless moves. A file or folder cannot be moved into a folder that does not exist.

Non-empty folder deletes. A folder cannot be deleted until it is empty.

Source-less file copies from one user to another (sometimes referred to as a CrossUserCopy). A CrossUserCopy operation on a file cannot succeed if the source of the copy has already been deleted.

Source-less directory/folder CrossUserCopies. A CrossUserCopy operation on a directory/folder cannot succeed if the source of the copy has already been deleted.

In some aspects, fewer, additional, or different constraints are applied by the local data model as well.

The objects 112 exist within the local data model 110 and may be organized into a hierarchical directory structure. In some aspects, the objects 112 comprise files and directories/folders. The objects may be associated with various attributes such as a resource identifier (ID), a parent resource ID, and a name. The resource ID is a unique value that is used to identify an object and to associate the object with an object stored by the network-based storage server 104. Similarly, the parent resource ID is another unique value that is used to identify a parent object. Continuing the file system example, the parent of a file would be a directory, and so the parent resource ID of a file would be a resource ID associated with a directory. Typically, the parent directory will also have its own parent. In this manner, a directory structure can be of an arbitrary depth. The name may be a textual descriptor of the object. In some aspects, the name is required to be unique among objects that share a parent. For example, within a file system, a file must have a name that is unique relative to any other files in the same directory.

The object metadata database 114 stores data about at least some of the objects 112. For example, the object metadata database 114 may store attributes (such as the previously discussed resource ID, parent resource ID, and name) of at least some of the objects 112. In at least some aspects, the object metadata database 114 stores one or more snapshots of the attribute values as they were the last time an object was synchronized. For example, the object metadata database 114 may store a snapshot of the resource ID, parent resource ID, and name for the objects that was captured the last time the objects were synchronized with the network-based storage server 104. The object metadata database 114 may also store a snapshot of these or other attributes as they exist on the network-based storage server 104 at other times (e.g., at a more recent time than the last synchronization).

The synchronization engine 108 is a component of the user computing device 102 that synchronizes a local data model 110 with the network-based storage server 104. The synchronization engine 108 may be configured to synchronize all of the objects 112. Alternatively, the synchronization engine 108 is configured to synchronize some of the objects 112 such as the files stored in one or more of the directories in the local data model 110. In some aspects, the synchronization engine comprises a scanner component and a realizer component. The scanner component scans the objects 112 to identify objects that have been changed since the last scan, and therefore need to be uploaded to the network-based storage server 104. The scanner component may determine when one of the objects 112 has been modified by comparing attributes of the object to snapshot attribute values stored in the object metadata database 114. The realizer component communicates with the network-based storage server 104 to determine when objects have been updated remotely and therefore need to be downloaded from the network-based storage server 104.

The scanner component of the synchronization engine 108 may run intermittently to identify changes to the objects 112. When the scanner component identifies an object that has been changed, a change may be generated and added to the set of changes 126 that are to be transmitted to the network-based storage server 104. Multiple objects may be changed between runs of the scanner component, and thus the scanner component may detect that multiple objects have changed during a single scan of the objects 112.

Because the scanner component compares the current attributes of the objects 112 to a snapshot of the objects, the scanner component merely identifies the objects that have changed, but does not necessarily determine the order in which the changes occurred. In some situations, the order of the changes is unimportant (e.g., when two new files are created in the same directory). In other situations, the order of the changes is important (e.g., when a directory/folder object is created and a file object is created within that directory/folder) and if the changes do not occur in the correct order, the constraints imposed by the data model (e.g., the local data model 110 or a server data model 122) would be violated. In at least some aspects, the local data model 110 rigidly enforces its constraints and will reject any changes that would violate the constraints. Various techniques for determining an acceptable order for performing the detected changes without violating the constraints imposed by the data model are described further herein.

The synchronization engine 108 stores information about the objects 112 that it is configured to synchronize in the object metadata database 114. For example, the synchronization engine 108 may store a resource ID, parent resource ID, and name for each file that has been synchronized from the network-based storage server 104. In addition to the previously described attributes, the synchronization engine 108 may also store other attributes or data associated with the objects 112 in the object metadata database 114 such as a version value, a last modified value, a hash value calculated from the contents of the object, and a synchronization status. The synchronization status indicates the current synchronization status of the object. For example, the synchronization status may indicate that synchronization is active for the file or that synchronization is on hold.

The user computing device 102 may also include other components such as a user agent (not shown) that allows a user to interact with objects 112. Examples of the user agent include file management applications (e.g., the Windows® explorer application from Microsoft Corporation of Redmond, Wash.), terminal applications, and file editor applications that run on the user computing device 102.

The network-based storage server 104 operates to provide network-based storage services to one or more computing devices such as the user computing device 102. As illustrated in FIG. 1, the network-based storage server 104 comprises a network-based storage services engine 118 and a data store 116. The network-based storage services engine 118 interacts with the synchronization engine 108 to provide access to the server data model 122 and objects 124 stored therein. For example, the network-based storage services engine 118 may transmit changes 130 to the synchronization engine 108. Additionally, the network-based storage services engine 118 may receive changes 128 from the synchronization engine 108. Typically, changes 128 and changes 130 will be sent back and forth between the synchronization engine 108 and the network-based services engine 118 to maintain synchronization between the local data model 110 and the server data model 122.

The data store 116 may be similar to the previously described data store 106 and may include one or more file systems and databases such as relational databases. The data store 116 includes a server data model 122 and an object metadata database 126. The server data model 122 may be similar to the previously described local data model 110 except that the server data model 122 is maintained by the network-based storage services engine. The server data model 122 includes objects 124. The object metadata database 126 stores data about the server data model 122 and the objects 124. The object metadata database 126 may be similar to the previously described object metadata database 114.

In FIG. 1, the data store 116 is shown as a component of the network-based storage server 104. Alternatives are possible, however. For example, the data store 116 may comprise one or more server computing devices. In some aspects, the data store 116 may comprise a distributed database or a distributed file system.

As used herein a server may comprise one or more computing devices, including one or more server farms, which may be located anywhere, including in proximity to the user computing device 102 or distributed in various locations throughout the world.

The synchronization engine 108 communicates with the network-based storage services engine 118 to synchronize the local data model 110 with the server data model 122. The synchronizing may comprise ensuring that the objects 112 and the objects 124 are the same, including ensuring that the content of the objects and the relationships between the objects are the same in both data models.

Although alternatives are possible, the synchronization engine 108 initiates and manages synchronization operations. The synchronization engine 108 may scan the local data model 110 for changes and, when found, transmit those changes to the network-based storage services engine 118. Additionally, the synchronization engine may send a request to the network-based storage services engine 118 for changes that have been made to the server data model 122.

In some aspects, the synchronization engine 108 sends the changes 128 according to the determined order for the network-based storage server 104 to receive and apply to the server data model 122 in the specified order. For example, the synchronization engine 108 may send the changes to the network-based storage server 104 as one or more ordered lists. Alternatively, the synchronization engine 108 may transmit the changes to network-based storage server 104 individually in accordance with the determined order.

In contrast, the network-based storage services engine 118 may send the changes 130 to the synchronization engine 108 as an unordered list. In this case, the synchronization engine 108 will need to determine an appropriate order for applying the changes such as by using the methods described herein. Alternatively, the synchronization engine 108 may send the changes 128 as an unordered list of changes or the network-based storage services engine 118 may send the changes as an ordered list as well. If the network-based storage services engine 118 receives an unordered list of changes, it may apply the methods described herein to determine an appropriate order for applying the changes as well.

Figure 2:
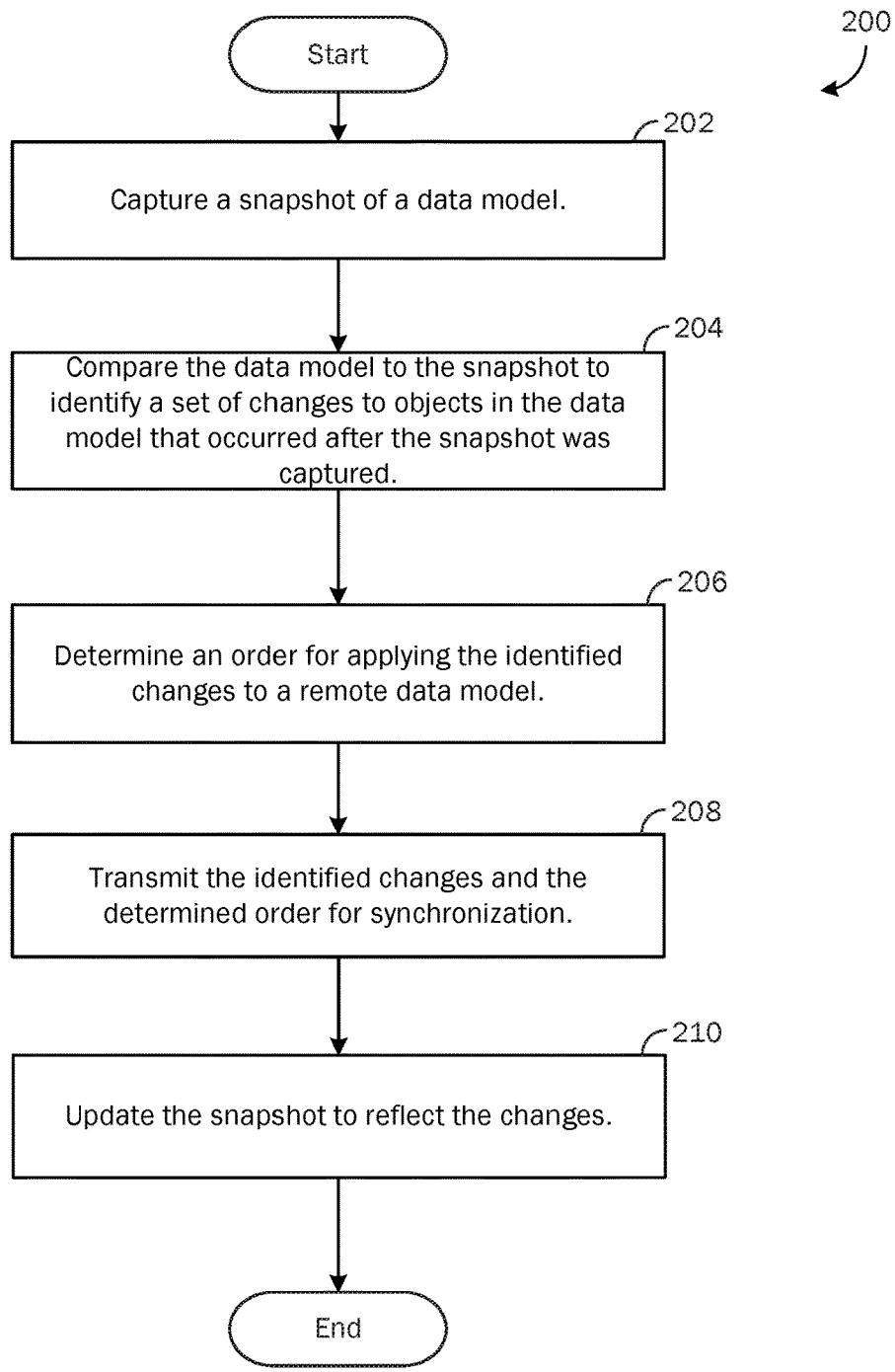
FIG. 2 illustrates a method for synchronizing changes from a local data model to a remote data model.

FIG. 2 illustrates a method 200 for synchronizing changes from a local data model to a remote data model. The method 200 may be executed by a component of a system such as the system 100. For example, the method 200 may be performed by the scanner component of the synchronization engine 108 to identify and transmit changes to the local data model 110 to the network-based storage services engine 118 as an ordered list of changes for application to the server data model 122. The method 200 may be executed on a device comprising at least one processor configured to store and execute operations, programs, or instructions.

At operation 202, a snapshot of a data model, such as the local data model 110, is captured. The snapshot may be captured and stored in the object metadata database 114. The snapshot may include information about the objects 112 that comprise the local data model 110. For example, the snapshot may comprise the resource ID, parent resource ID, and name of each of the objects 112. Although alternatives are possible, the snapshot does not include the content of the objects 112. Instead, the snapshot may include one or more hash values computed from the content that can be used to determine when the content has been modified. In some aspects, the snapshot corresponds to the local data model 110 as of the last time the local data model 110 was synchronized with the server data model 122. In some aspects, the snapshot is captured by updating an existing snapshot or by receiving the snapshot from another device such as the network-based storage server 104.

At operation 204, the data model is compared to the snapshot to identify changes to the objects in the data model that occurred after the snapshot was captured. Operation 204 may be performed on a scheduled basis, on intervals, or on demand. To identify changes, attributes of the objects in the data model are compared to attributes in the snapshot. If the attributes of the objects in the data model are different than those in the snapshot, it may be determined that a change to the object has occurred and should be transmitted to the network-based storage server. When it is determined that an object has been changed, the change may be added to a list of changes. In some aspects, the list stores the identity of the object that has changed and the attributes of the object that are changed. For example, if a file object is moved from one parent folder to another, the list will store the reference ID of the file object and an indication that the parent reference ID of the file object has changed. As another example, if a file object is renamed, the list will store the reference ID of the file object and an indication that the name has changed. Sometimes, it will be determined that the object has multiple changes (e.g., the parent folder and the name may both change).

At operation 206, an order for applying the identified changes is determined. The order may be determined based on analyzing an object attribute outcome state of each of the changes and then comparing those outcome states to the required states for performing the changes. The required states for performing the changes may be determined based on the nature of the change and the constraints applied by the data model. As an example, when a change comprises moving a file object from a source parent folder to a destination parent folder, the data model will require that the destination parent folder exists. Accordingly, if one of the identified changes results in the parent folder being created (i.e., the outcome attribute state of the change is that the parent folder exists), then that change will need to be performed before the file object is moved. In other words, the file move change is dependent on the destination parent folder creation change. If none of the requirements for a change are affected by the object attribute outcome states of the other changes, the change is not dependent on any of the other changes. Based on identifying the dependencies, the changes are ordered so that each change is performed only after any of the other changes it depends on have already been performed.

At operation 208, the identified changes and the determined order are transmitted for synchronization. For example, the changes may be transmitted as an ordered list (or multiple ordered lists) to the network-based storage services engine 118. In some aspects when multiple ordered lists are transmitted, the multiple ordered lists are generated so that they can be applied independently of each other (i.e., in any order). For example, if the changes form a dependency graph that includes separate (disconnected) regions, indicating that there are no dependencies between the changes in the separate regions, each of the separate regions may be transmitted as a separate ordered list. The lists may be transmitted in parallel for more efficiency or better performance and throughput. Alternatively, the identified changes may be sent individually in accordance with the determined order. In some aspects, the network-based storage services engine 118 may send an acknowledgement back or an indication that the changes were successfully applied to the server data model 122.

At operation 210, the snapshot is updated to reflect the identified changes. Afterwards, the method 200 may be performed again to identify any additional changes that have occurred in the intervening time.

Figure 3:
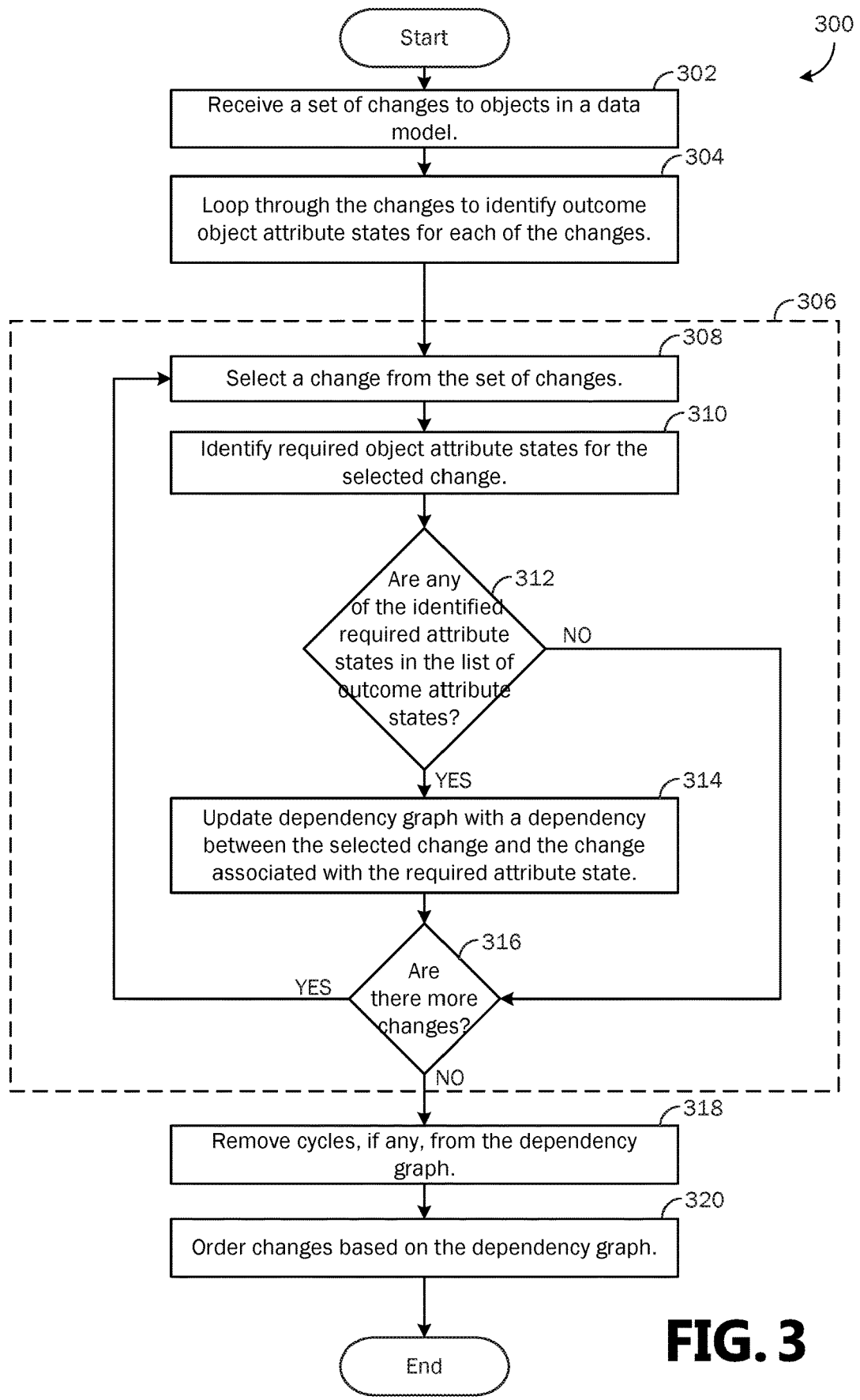
FIG. 3 illustrates a method for ordering a set of changes to a data model.

FIG. 3 illustrates a method 300 for ordering a set of changes to a data model. The method 300 may be executed by a component of a system such as the system 100. For example, the method 300 may be performed by the synchronization engine 108 to order changes identified by a scanner component or received from the network-based storage services engine 118. Similarly, the network-based storage services engine 118 may perform the method 300 to order changes identified in the server data model 122 or to order changes received from the synchronization engine 108. The method 300 may be executed on a device comprising at least one processor configured to store and execute operations, programs, or instructions.

At operation 302, a set of changes to objects in a data model are received. For example, the changes may be identified by the scanner component of the synchronization engine by comparing the local data model 110 to a snapshot of the local data model 110 that was captured at the time of the last synchronization.

At operation 304, the changes are looped through to identify the outcome object attribute states for each of the changes. Each change may be analyzed and based on the nature of the change, the affected objects and the outcome attribute states for those affected objects are determined. Table 1 below shows a non-limiting list of the attribute states that are affected based on the change type. In some aspects, additional, different, or fewer attributes are affected by at least some of the change types.

TABLE 1

| Change Type | Modifies | Requires Existence Of |
|---|---|---|
| FileAdd | ResourceID, Name, and ParentResourceID | ParentResourceID and availability of Name + ParentResourceID |
| FileMove (Rename) | Name and ParentResourceID of source file; Name and ParentResourceID of destination file | ResourceID; Destination ParentResourceID and availability of Name + ParentResourceID |
| FileMove (Move) | Name and ParentResourceID of source file; Name and ParentResourceID of destination file; and Count of children of source ParentResourceID | ResourceID; Destination ParentResourceID and availability of Name + ParentResourceID |
| FileDelete | Name and Parent ResourceID; ResourceID; Count of children of ParentResourceID | ResourceID |
| FileChange | None | ResourceID |
| FileCrossUserCopy | Name and ParentResourceID of destination file; ResourceID; completion of copy of source | ResourceID of Source; Destination ParentResourceID; availability of Name + ParentResourceID |

TABLE 1-continued

| Change Type | Modifies | Requires Existence Of |
|---|---|---|
| FileCrossScopeMove Delete | Name and ParentResourceID of Source File, ResourceID of source file; Count of children of ParentResourceID | ResourceID of Source; completion of copy of source |
| FolderAdd | Name and ParentResourceID, ResourceID | ParentResourceID; Availability of name + ParentResourceID |
| FolderMove (Rename) | Name and ParentResourceID of source folder; Name and ParentResourceID of destination folder | ResourceID, ParentResourceID; Availability of name + ParentResourceID |
| FolderMove (Move) | Name and ParentResourceID of source folder; Name and ParentResourceID of destination folder; Count of children of ParentResourceID | ResourceID, ParentResourceID; Availability of name + ParentResourceID |
| FolderDelete | Name and Parent ResourceID; ResourceID; Count of children of ParentResourceID | ResourceID; Empty count of children of ResourceID |
| FolderChange | None | ResourceID |
| FolderCrossUserCopy | Name and ParentResourceID of destination folder; ResourceID; completion of copy of source | Source ResourceID; ParentResourceID; Availability of Name + ParentResourceID |
| FolderCrossScopeMove Delete | Name and Source ParentResourceID; ResourceID; Count of Children of ParentResourceID | ResourceID; Empty count of children of ResourceID; completion of copy of source |

As an example, the first change may be adding a file to a directory (FileAdd). Adding the file will modify the state of the resource ID for the file by bringing it into existence. Adding the file will also modify the name and parent resource ID of the file by setting those. There are other attributes that will also be affected by adding the file that are not listed in the table above. In some aspects, the affected objects and the outcome attribute states are determined in part by looking up the change type in a data structure that stores information similar to that shown in Table 1.

In some aspects, the outcome state of each of the attributes of the affected objects is stored in a data structure, such as an associative array, that allows for efficient searching using the outcome state. With an associative array, the outcome state may be stored as the key and the change stored as the value. The operation 304 continues until all of the object attribute outcome states have been added to the data structure for all of the changes.

In some aspects, various operations may be replaced with multiple operations. For example, a file/folder move operation could be separated into file/folder add and file/folder delete operations. This separation may be necessary when the operation cannot be performed by updating metadata (e.g., as may be the case in some implementation of cross-scope moves). In these cases, the multiple operations are treated as individual changes for purposes of the method 300 and an appropriate order for each of the individual changes will be determined.

The loop 306 iterates through the changes to identify dependencies. At operation 308, a change is selected from the set of changes. For example, when the loop 306 is initialized, operation 308 may select the first change in the set of changes. Thereafter, operation 308 may select the next change in the set of changes until all of the changes have been through the loop 306.

At operation 310, the required object attribute states for the selected change are identified. Based on the type of change being performed, the required object attribute states can be determined. Table 1 above provides a non-limiting example of the required object attribute states. As an example, when a change corresponding to a file addition (FileAdd) is evaluated, the requirements that the parent resource ID for the file exist is identified. Additionally, the requirement that the combination of the parent resource ID and the name be available is identified.

At operation 312, the data structure generated in operation 304 is evaluated to determine whether the identified required attribute states are an outcome of any of the other changes. If so, the method proceeds to operation 314. If not, the method proceeds to operation 316.

At operation 314, a dependency graph is updated to include a dependency between the selected changes and the one or more changes associated with the required attribute state. In some examples, the dependency graph is stored using a data structure that stores pointers from a first change to any other changes it depends on.

At operation 316, it is determined whether there are more changes to process. If so, the method returns to operation 308, where another change is selected and the loop 306 begins again. If not, the loop ends, and the method proceeds to operation 318.

At operation 318, the dependency graph is evaluated to identify and remove cycles. For example, the dependency graph may be traversed in a depth-first manner to detect cycles. If a node in the dependency graph is revisited during the depth first traversal, a cycle is detected. To remove the cycle, the object attribute state that causes the cycle is identified. For example, the changes encountered in the cycle may be analyzed to identify the required object attributes for the states. If the required object attribute state of an already visited change in the cycle is the outcome attribute state of a later-visited change, the cycle relates to that attribute state. The cycle may be broken by adding extra changes to introduce a temporary attribute state for one of the objects that is not part of the cycle. For example, if the changes are (1) to change the name of a file with resource ID=1 from "A.txt" to "B.txt," and (2) to change the name of a file with resource ID=2 from "B.txt" to "A.txt," there is a cycle because both changes depend on the other change being completed first (i.e., A.txt cannot be renamed to B.txt because the name B.txt is already in use and B.txt cannot be renamed to A.txt because the name A.txt is already in use as well). To break this cycle, a temporary change is added such as renaming A.txt to "TEMP.txt." Then, B.txt can be renamed to A.txt. Thereafter, the file named TEMP.txt can be renamed to B.txt. Additional examples are illustrated in at least FIGS. 4 and 5.

At operation 320, the changes are ordered based on the dependency graph. For example, any changes that do not depend on other changes will be ordered first. Then the remaining changes can be added to the list when the changes they depend on are added. Once this ordered list is constructed, the changes can be applied to the local data model 110 or transmitted to the network-based storage services engine 118 for application to the server data model 122.

Figure 4:
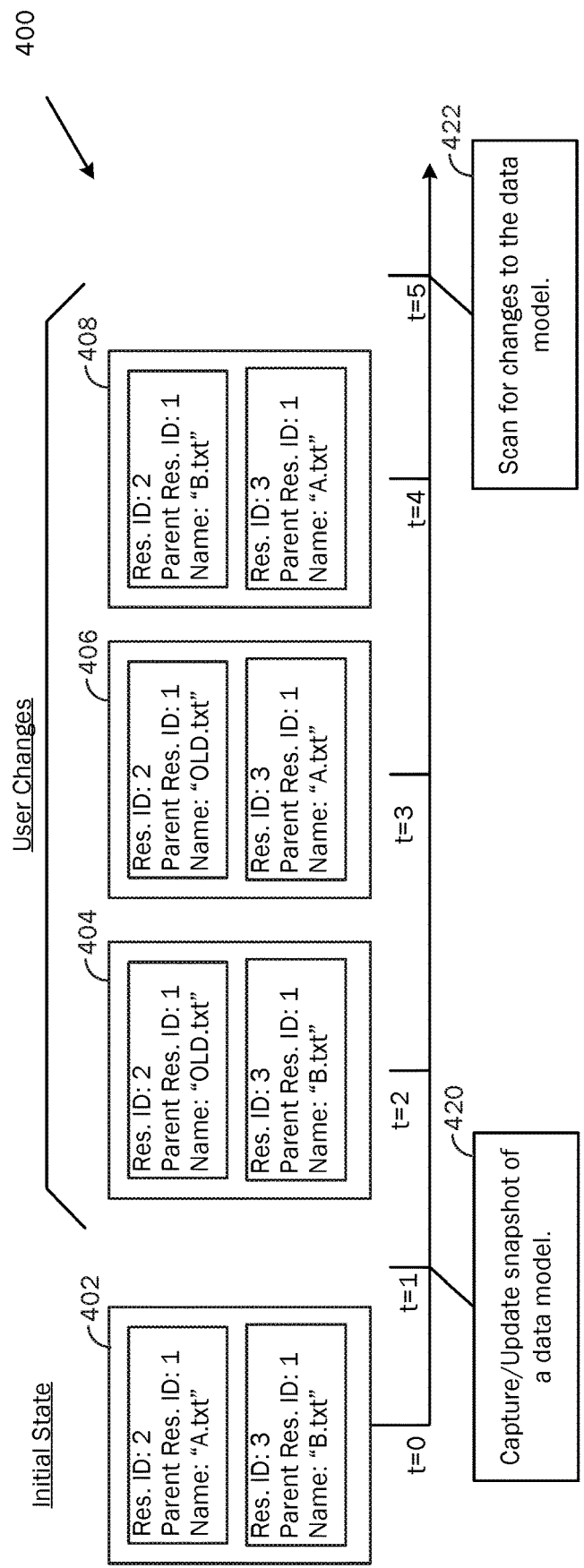
FIG. 4 shows a timeline of an example scenario in which both a user and the synchronization engine are interacting with a data model.
Figure 5:
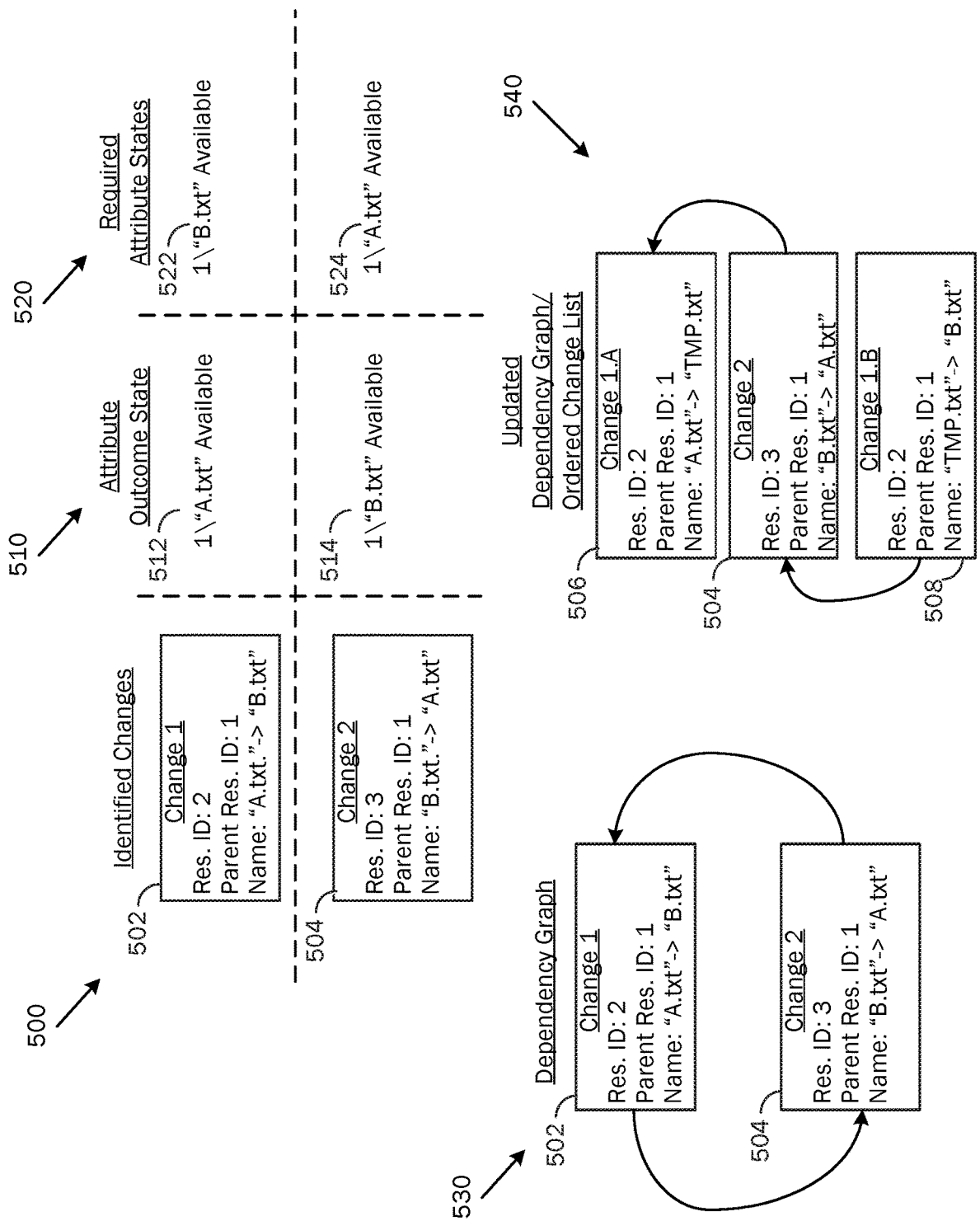
FIG. 5 illustrates some of the steps performed by the synchronization engine to generate an ordered list of changes for the example in FIG. 4.

FIGS. 4 and 5 illustrate an example scenario in which changes are ordered by a synchronization engine. FIG. 4 shows a timeline 400 of an example scenario in which both a user and the synchronization engine are interacting with a data model. FIG. 5 illustrates some of the steps performed by the synchronization engine to generate an ordered list of changes for the example in FIG. 4.

At time t=0, the initial model state 402 of a data model is shown. For purposes of this example, only portions of the data model are shown. The illustration of the data model includes two objects: one with a resource ID equal to 2 and name "A.txt," and one with a resource ID equal to 3 and name "B.txt." Both objects are in the same folder/directory because they both have a parent resource ID equal to 1.

At time t=1, the synchronization engine performs operation 420 to capture or update a snapshot of the data model. Then, at times t=2 through time t=4, the user makes various changes to the objects in the data model. At time t=2, the user renames the object with resource ID equal to 2 from "A.txt" to "OLD.txt" (shown at intermediate model state 404). At time t=3, the user renames the object with resource ID equal to 3 from "B.txt" to "A.txt" (shown at intermediate model state 406). The data model allows this rename operation to proceed because the parent directory no longer contains an object named "A.txt" so the name is available. At time t=4, the user renames the object with resource ID equal to 2 from "OLD.txt" to "B.txt" (shown at final model state 408).

Then, at time t=5, the synchronization engine performs operation 422 to scan for changes in the data model. The synchronization engine does not see the intermediate model states 404 and 406. Instead, the synchronization engine sees the final model state 408 and compares it to the initial model state 402 to generate changes.

FIG. 5 shows a set 500 of changes that are identified by the synchronization engine. The set 500 includes a first change 502 that applies to the object with resource ID equal to 2 and changes the name from "A.txt" to "B.txt" and a second change 504 that applies to the object with resource ID equal to 3 and changes the name from "B.txt" to "A.txt."

The synchronization engine generates a list 510 of attribute outcome states of the identified changes. The list 510 is not necessarily complete, but instead includes the outcome attribute states that are important for illustrating this example. Specifically, the attribute outcome state 512 of the first change 502 is that the name 1\"A.txt" (i.e., the name "A.txt" within the parent directory with resource ID equal to 1) is available. The attribute outcome state 514 of the second change 504 is that the name 1\"B.txt" (i.e., the name "B.txt" within the parent directory with resource ID equal to 1) is available.

The synchronization engine also generates a list 520 of required attribute states to perform the identified changes. The list 520 is not necessarily complete, but instead includes the required attribute states that are important for illustrating this example. Specifically, the required attribute state 522 for performing the first change 502 is that the name 1\"B.txt" (i.e., the name "B.txt" within the parent directory with resource ID equal to 1) is available. The required attribute state 524 for performing the second change 504 is that the name 1\"A.txt" (i.e., the name "A.txt" within the parent directory with resource ID equal to 1) is available.

The synchronization engine then constructs a dependency graph 530 based on matches between the list 520 of required attributes states and the list 510 of attribute outcome states. In this example, the first change 502 is dependent on the second change 504 because the required attribute state 522 for performing the first change 502 matches the attribute outcome state 514 of the second change 504. Additionally, the second change 504 is dependent on the first change 502 because the required attribute state 524 for performing the second change 504 matches the attribute outcome state 512 of the first change 502.

Since the first change 502 depends on the second change 504 and the second change 504 depends on the first change 502, the dependency graph 530 includes a cycle. In some aspects, this cycle is detected by traversing the graph in a depth first manner, until a node is revisited. For example, the traversal starts at the first change 502, and continues to the second change 504 because the first change 502 depends on the second change 504. Then the traversal continues from the second change 504 back to the first change 502 because the second change 504 depends on the first change. Because the first change is revisited, a cycle is detected.

In some aspects, to determine when a node is revisited, a data structure (such as a set) is maintained to track each change that has been visited. When a change is visited, the change is added to the set. But before being added, the set is checked to see whether the change is already in the set. If the change is already in the set, it is determined that the node is being revisited (and accordingly that a cycle exists).

The cycle is broken by replacing the first change with two additional changes 506 and 504 as shown in the updated dependency graph/ordered change list 540. Change 506 modifies the name of the object with resource ID equal to 2 from "A.txt" to "TMP.txt." Change 508 then modifies the name of the object with resource ID equal to 2 from "TMP.txt" to "B.txt." The change 506 is not dependent on any of the other changes because its required attribute state (the name "TMP.txt" is available in the parent directory) does not match the outcome state of any of the changes.

The second change 504 depends on change 506 because its required attribute state (the name "A.txt" is available in the parent directory) matches the outcome state of the change 506. And the change 508 depends on the second change 504 because its required attribute state (the name "B.txt" is available in the parent directory) matches the outcome attribute state of the second change 504. As can be seen, the updated dependency graph 540 does not contain a cycle. Accordingly, the changes can be transmitted or performed in the order shown (i.e., 506, 504, 508).

Figure 6:
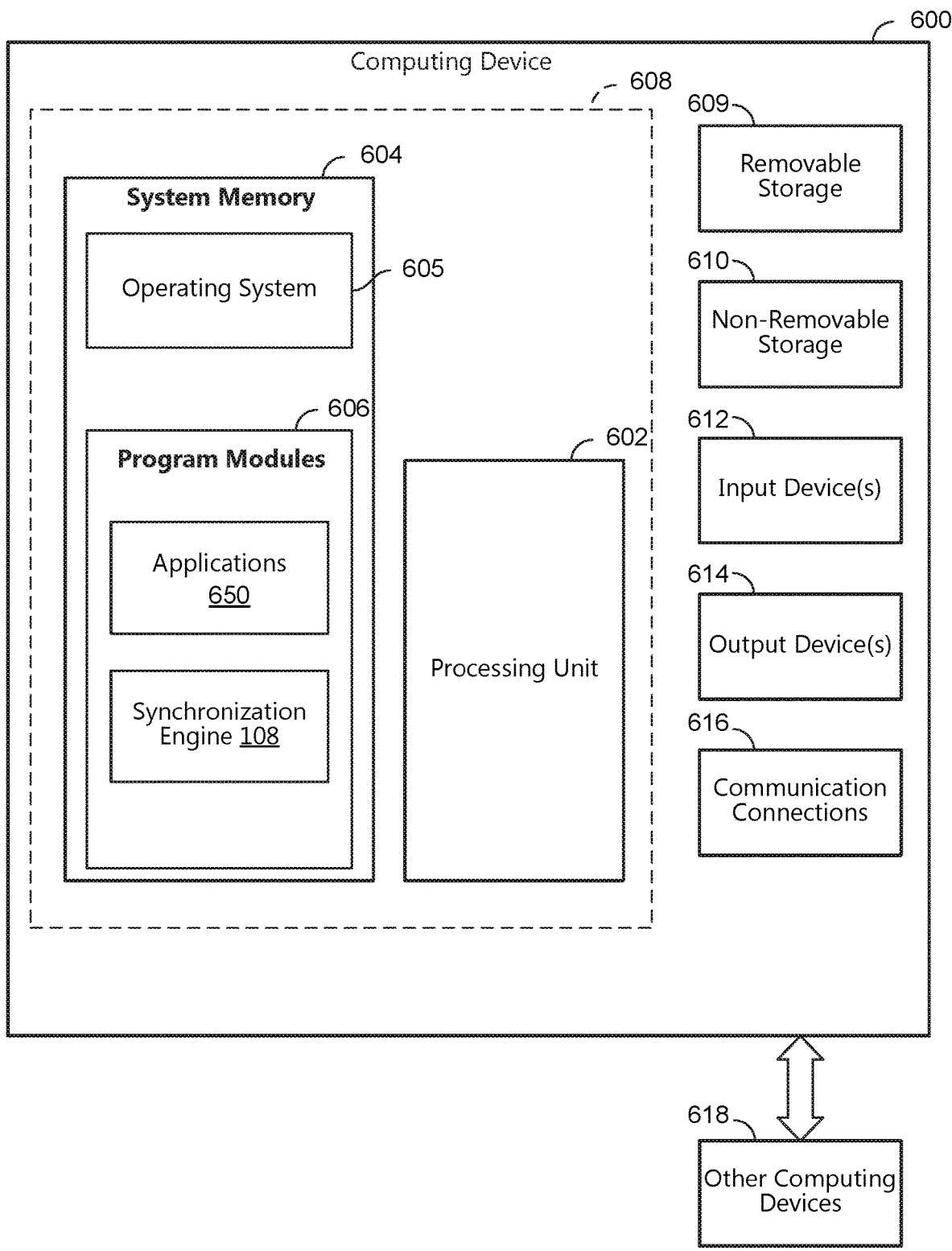
FIG. 6 is a block diagram illustrating example physical components of a computing device.
Figure 7A:
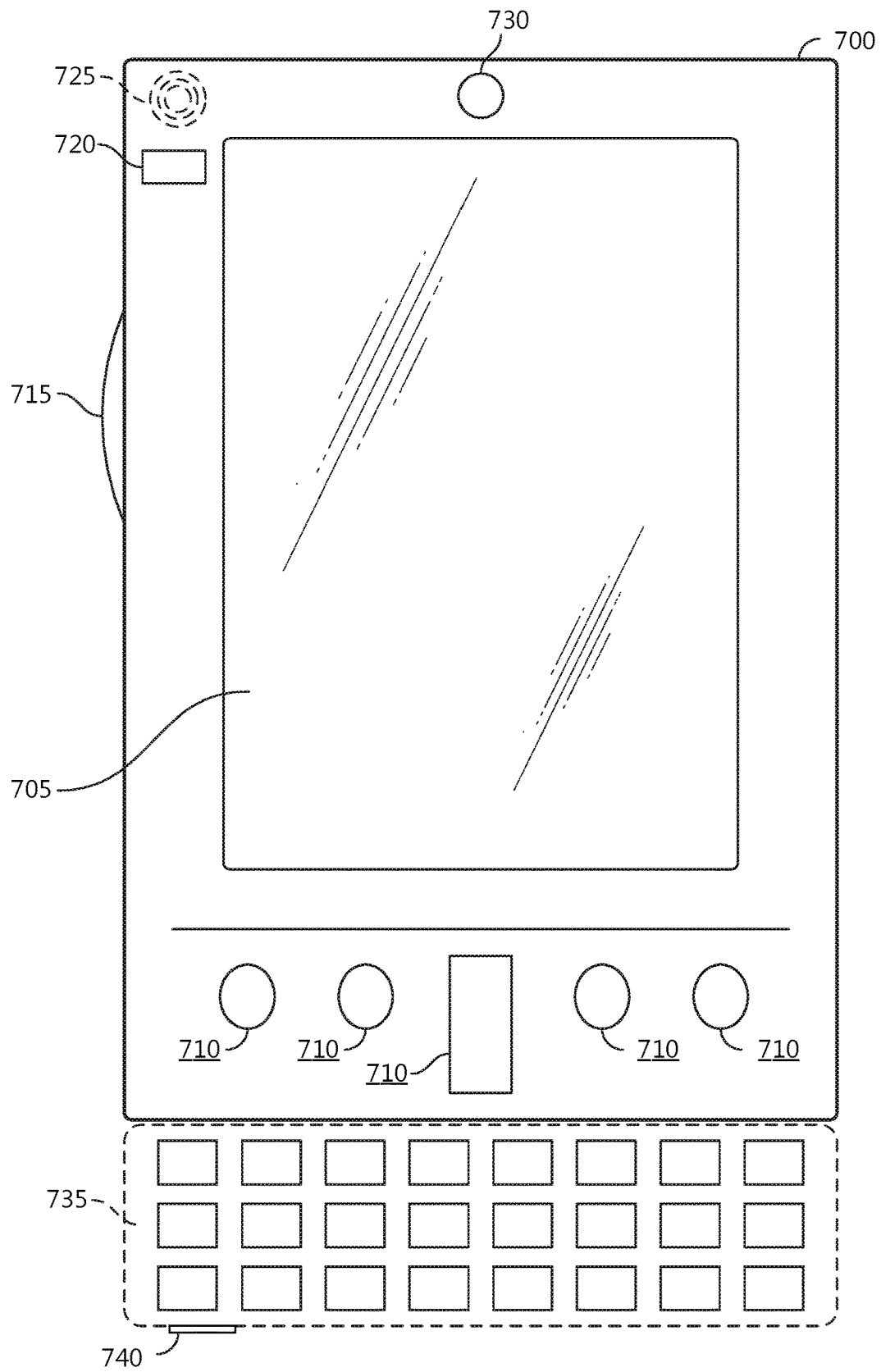
FIGS. 7A and 7B are block diagrams of a mobile computing device.
Figure 7B:
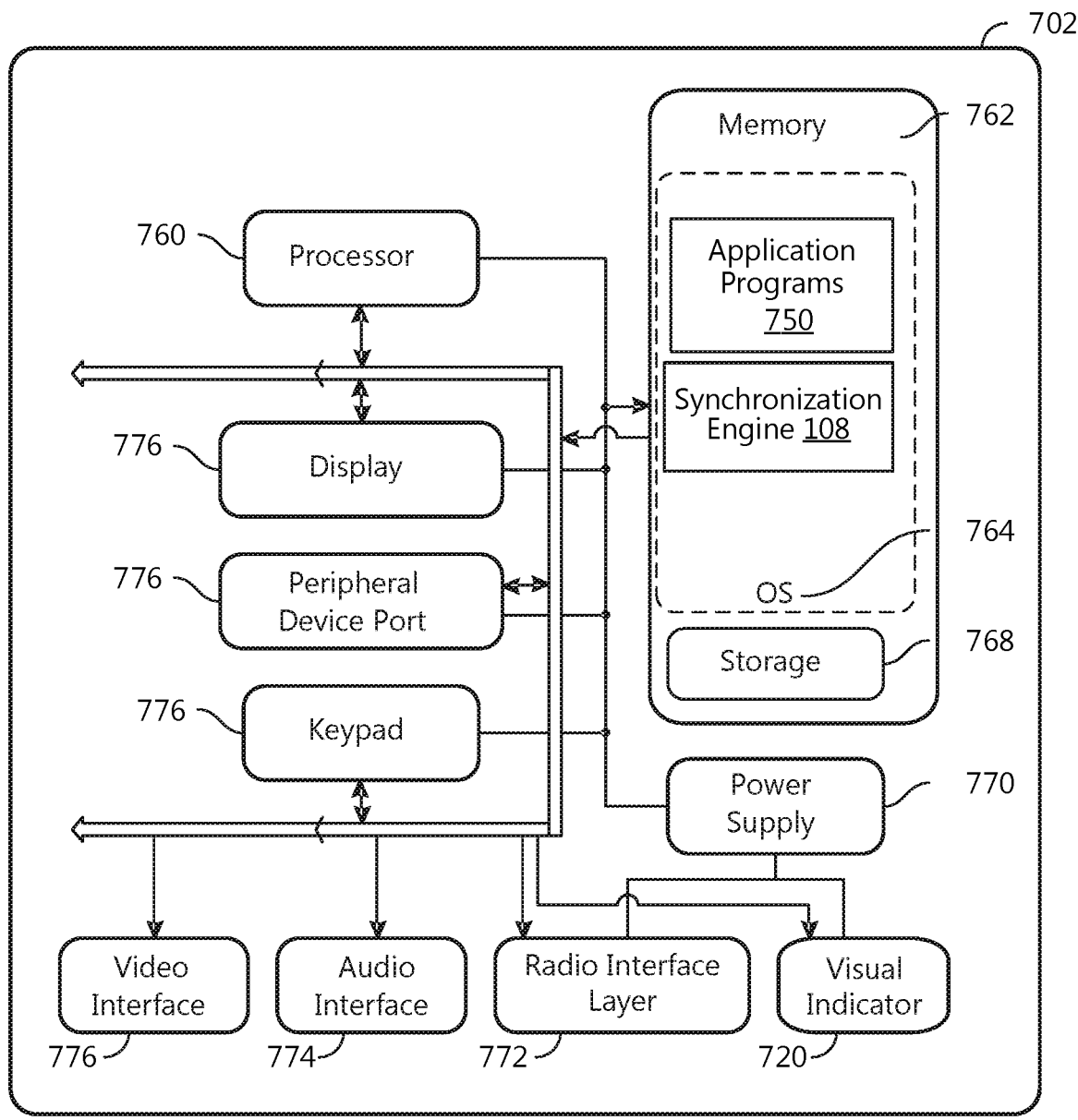
Figure 8:
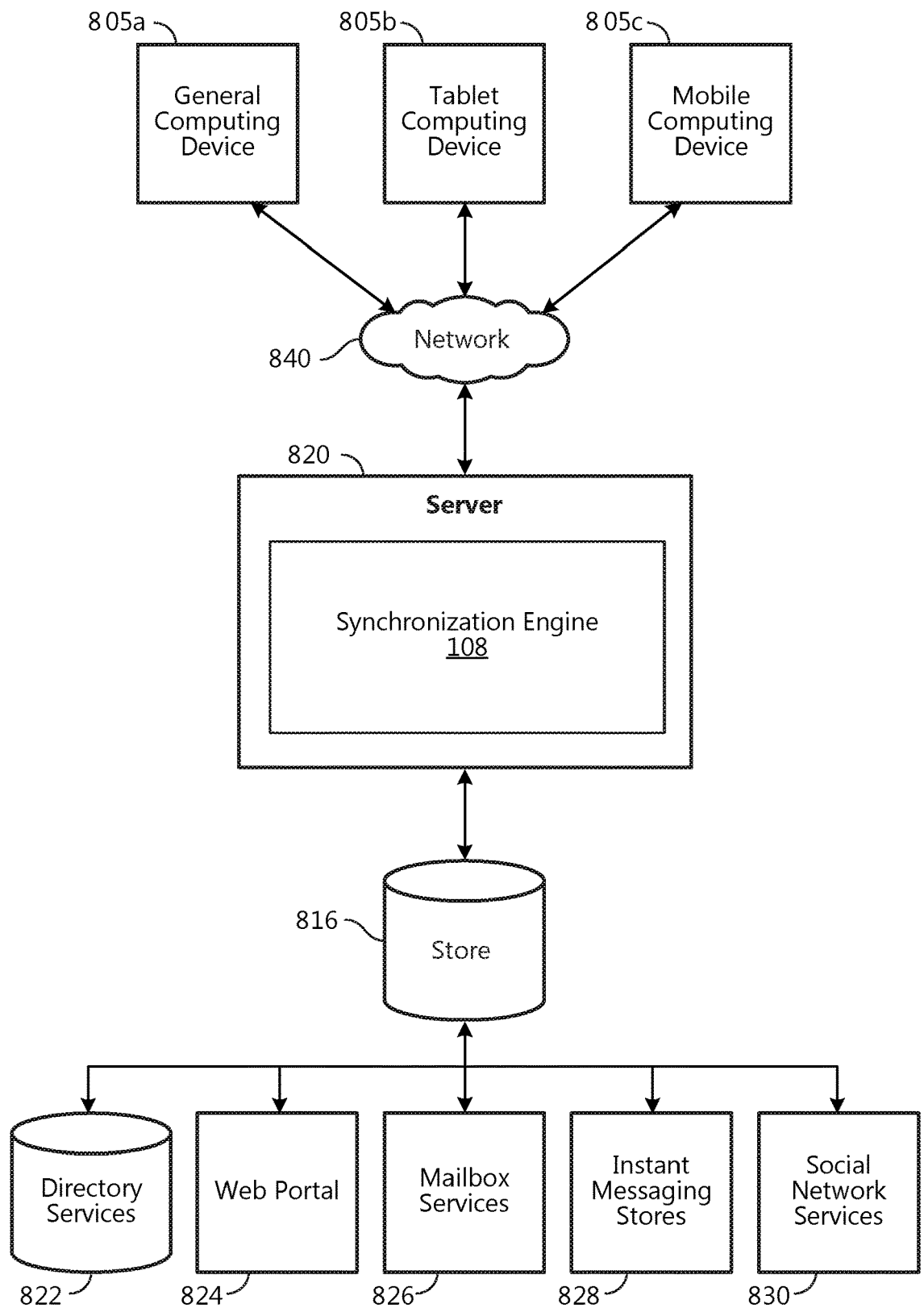
FIG. 8 is a block diagram of a distributed computing system.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes the synchronization engine 108. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., the synchronization engine 108) perform processes including, but not limited to, one or more of the stages of the method 200 and 300 illustrated in FIGS. 2 and 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or fewer input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the synchronization engine 108 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 are stored locally on the mobile computing device 700, as described above. According to another aspect, the data are stored on any number of storage media that are accessible by the device via the radio 772 or via a wired connection between the mobile computing device 700 and a separate computing device associated with the mobile computing device 700, for example, a server computer in a distributed computing network, such as the Internet. As should be appreciated such data/information are accessible via the mobile computing device 700 via the radio 772 or via a distributed computing network. Similarly, according to an aspect, such data/information are readily transferred between computing devices for storage and use according to well-known data/information transfer and storage means, including electronic mail and collaborative data/information sharing systems.

FIG. 8 illustrates one example of the architecture of a system for ordering changes for data model synchronization as described above. Content developed, interacted with, or edited in association with the synchronization engine 108 is enabled to be stored in different communication channels or other storage types. For example, various documents may be stored using a directory service 822, a web portal 824, a mailbox service 826, an instant messaging store 828, or a social networking site 830. The synchronization engine 108 is operative to use any of these types of systems or the like for ordering changes for data model synchronization, as described herein. According to an aspect, a server 820 provides the synchronization engine 108 to clients 805*a,b,c*. As one example, the server 820 is a web server providing the synchronization engine 108 over the web. The server 820 provides the synchronization engine 108 over the web to clients 805 through a network 840. By way of example, the client computing device is implemented and embodied in a personal computer 805*a*, a tablet computing device 805*b* or a mobile computing device 805*c* (e.g., a smart phone), or other computing device. Any of these examples of the client computing device are operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A system for synchronizing a local object model with a remote object model, comprising:
   at least one processor; and
   memory, operatively connected to the at least one processor and storing instructions that, when executed by the at least one processor, cause the at least one processor to:
   receive a first change and a second change of a plurality of changes associated with the local object model, wherein the first change and the second change modify at least one attribute of at least one object in the local object model, and wherein the first change and the second change have been identified by a comparison of the local object model to a previous version of the local object model;
   identify a first outcome attribute state of the first change to the local object model, wherein the first outcome attribute state comprises a first attribute state of the local object model being affected by the first change;
   identify a second outcome attribute state of the second change to the local object model, wherein the second outcome attribute state comprises a second attribute state of the local object model being affected by the second change;
   based on the first outcome attribute state of the first change and a first type of the first change, identify a first required attribute state of the first change, wherein the first required attribute state comprises a third attribute state of the local object model, the third attribute state being a prerequisite to the first change;
   generate a dependency graph for the plurality of changes based on the identified required attribute states, wherein the dependency graph comprises a first node and a second node and an edge, wherein the first node corresponds to the first change and the second node corresponds to the second change, the edge connecting from the second node to the first node when the first required attribute state of the first change and the second outcome attribute state of the second change are identical; and
   generate an ordered list of the plurality of changes based on the dependency graph for synchronizing the remote object model with the local object model.

2. The system of claim 1, wherein the plurality of changes are received by comparing the at least one object in the local object model to a snapshot generated during a previous synchronization operation between the local object model and the remote object model.

3. The system of claim 2, wherein the memory further stores instructions that when executed by the at least on processor, cause the at least one processor to transmit the ordered list to a network-based storage server for application to the remote object model.

4. The system of claim 1, wherein the plurality of changes are received from a network-based storage server that stores the remote object model.

5. The system of claim 4, wherein the memory further stores instructions that when executed by the at least on processor, cause the at least one processor to apply the changes to the local object model in accordance with the ordered list.

6. The system of claim 1, wherein the dependency graph comprises at least one reference from the first change of the plurality of changes to the second change of the plurality of changes, the reference indicating that the second outcome attribute state of the second change is the first required attribute state of the first change.

7. The system of claim 1, wherein the local object model is a file system and the at least one object comprises a file or directory within the file system.

8. The system of claim 1, wherein the memory further stores instructions that when executed by the at least on processor, cause the at least one processor to:
   determine whether the dependency graph includes a cycle, wherein the second required attribute state of the second change and the first outcome attribute state of the first change are identical; and
   when determined that the dependency graph includes a cycle:
   identify a temporary object, wherein the temporary object is independent of the first change and the second change causing the cycle; and
   generate additional changes related to the attribute state based on the temporary object to remove the cycle.

9. The system of claim 8, wherein to determine whether the dependency graph includes a cycle, the memory further stores instructions that when executed by the at least on processor, cause the at least one processor to:
   traverse the changes in the dependency graph in a depth first manner; and
   determine whether a change is visited more than once during the traversal.

10. The system of claim 1, wherein the identified outcome attribute states are stored in an associative array that associates the identified outcome attribute states with the changes.

11. A method for synchronizing a local object model with a remote object model, comprising:

receiving a first change and a second change of a plurality of changes associated with the local object model, wherein the first change and the second change modify at least one attribute of at least one object in the local object model, and wherein the first change and the second change have been identified by a comparison of the local object model to a previous version of the local object model;

identifying a first outcome attribute state of the first change to the local object model, wherein the first outcome attribute state comprises a first attribute state of the local object model being affected by the first change;

identifying a second outcome attribute state of the second change to the local object model, wherein the second outcome attribute state comprises a second attribute state of the local object model being affected by the second change;

based on the first outcome attribute state of the first change and a first type of the first change, identifying a first required attribute state of the first change, wherein the first required attribute state comprises a third attribute state of the local object model, the third attribute state being a prerequisite to the first change;

generating a dependency graph for the plurality of changes based on the identified required attribute states, wherein the dependency graph comprises a first node and a second node and an edge, wherein the first node corresponds to the first change and the second node corresponds to the second change, wherein the edge connects from the second node to the first node when the first required attribute state of the first change and the second outcome attribute state of the second change are identical; and determining an order of operations for the plurality of changes based on the dependency graph for synchronizing the remote object model with the local object model.

12. The method of claim 11, wherein receiving the plurality of changes comprises generating the plurality of changes by comparing the at least one object in the local object model to a snapshot generated during a previous synchronization operation between the local object model and the remote object model.

13. The method of claim 12, further comprising transmitting the plurality of changes to a network-based storage server for application to the remote object model in accordance with the determined order.

14. The method of claim 13, further comprising transmitting an ordered list of the changes to the network-based storage server.

15. The method of claim 13, further comprising transmitting in parallel a plurality of ordered lists of the changes to the network-based storage server.

16. The method of claim 11, wherein the plurality of changes are received from a network-based storage server that stores the remote object model, the method further comprising applying the changes to the local object model in accordance with the determined order.

17. The method of claim 11, wherein the dependency graph comprises at least one reference from a first change of the plurality of changes to a second change of the plurality of changes, the reference indicating that an outcome attribute state of the second change is a required attribute state of the first change.

18. The method of claim 11, further comprising:
determining whether the dependency graph includes a cycle, wherein the second required attribute state of the second change and the first outcome attribute state of the first change are identical; and
when determined that the dependency graph includes a cycle:
identifying a temporary object, wherein the temporary object is independent of the first change and the second change causing the cycle; and
generating additional changes related to the attribute state based on the temporary object to remove the cycle.

19. The method of claim 18, wherein determining whether the dependency graph includes a cycle, comprises:
traversing the nodes in the dependency graph in a depth first manner; and
determining whether a node is visited more than once during the traversal; and
when determined that the node is visited more than once, determining that the dependency graph includes a cycle.

20. A computer readable storage medium storing computer executable instructions which, when executed by a computer, perform a method for synchronizing a local object model with a remote object model, the method comprising:
receiving a first change and a second change of a plurality of changes associated with the local object model, wherein the first change and the second change modify at least one attribute of at least one object in the local object model, and wherein the first change and the second change have been identified by a comparison of the local object model to a previous version of the local object model;
identifying a first outcome attribute state of the first change to the local object model, wherein the first outcome attribute state comprises a first attribute state of the local object model being affected by the first change;
identifying a second outcome attribute state of the second change to the local object model, wherein the second outcome attribute state comprises a second attribute state of the local object model being affected by the second change;
based on the first outcome attribute state of the first change and a first type of the first change, identifying a first required attribute state of the first change, wherein the first required attribute state comprises a third attribute state of the local object model, the third attribute state being a prerequisite to the first change;
generating a dependency graph for the plurality of changes based on the identified required attribute states, wherein the dependency graph comprises a first node and a second node and an edge, wherein the first node corresponds to the first change and the second node corresponds to the second change, the edge connecting from the second node to the first node when the first required attribute state of the first change and the second outcome attribute state of the second change are identical; and
determining an order for the plurality of changes based on the dependency graph.

* * * * *